Patented Dec. 4, 1951

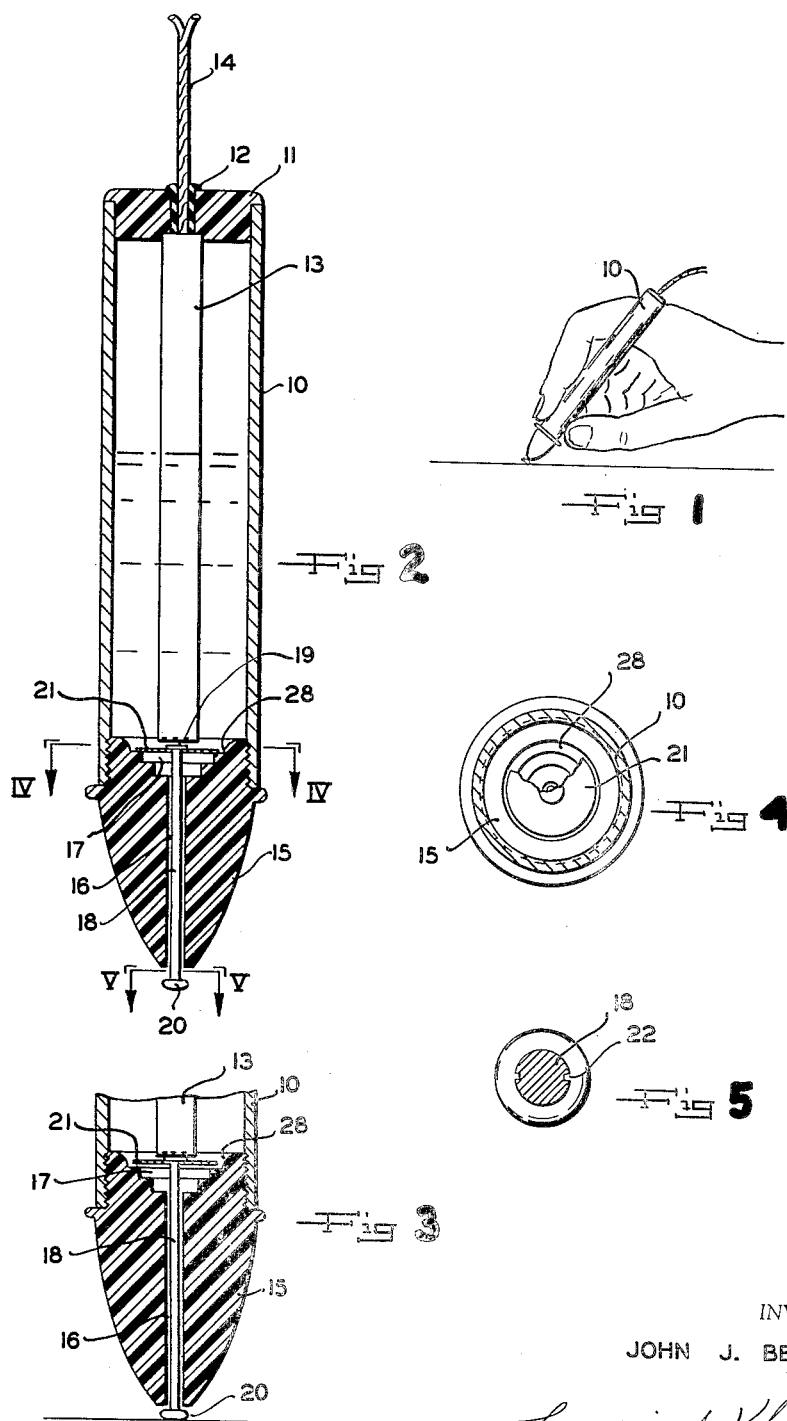

2,577,721

UNITED STATES PATENT OFFICE 2,577,721

ELECTRICALLY HEATED FOUNTAIN STYLUS

John J. Belak, Youngstown, Ohio, assignor of one-half to Theodore M. Szemborn, Campbell, Ohio Application December 2, 1949, Serial No. 130,817

3 Claims. (Cl. 219—21)

This invention relates to marking and/or coating equipment and more particularly to an improved pen or stylus for the application of heat-softenable material such as masking wax, for example. Thus, the apparatus of the invention is particularly, but not exclusively, adaptable to the decorating art where it is desired in many instances to provide on surfaces to be painted or dyed certain decoratively designed areas masked with wax so that in the final outcome of the process such areas will be free of the applied coloring or coating. The apparatus of the invention comprises essentially a fountain type of stylus applicator in which an electrically heated reservoir is provided for the wax or other material to be dispensed and wherein the heating element may be so disposed as to retain the areas of maximum temperature at points spaced inwardly from the surfaces of the implement which are engaged by either the hands or fingers of the user.

A further object of the invention is the provision in apparatus of the character described of an improved arrangement for applying heat to the wax dispensing extremity of the implement so that a free flow of the wax is maintained under all normal conditions of use.

A still further object of the invention is the provision of an improved arrangement in apparatus of the character described for automatically reducing the heat applied to the dispensing extremity of the implement when the implement is not in use so that thereby wasteful dripping from the implement is prevented.

The above and other objects and advantages of the invention will become apparent upon consideration of the following detailed specification and the accompanying drawing wherein there is disclosed a preferred embodiment of the invention.

In the drawing:

Figure 1 is a side elevation of an electrically heated fountain type of wax applicator constructed according to the invention and shown in position in a user's hand;

Figure 2 is a longitudinal section through the implement of Figure 1;

Figure 3 is a longitudinal section of the lower end portion of the implement, showing the relative position of the parts when pressure is maintained on the applicator stylus during normal use of the implement; and Figures 4 and 5 are transverse sectional views of the apparatus of Figure 2, the sections being taken on the lines A—A and B—B of Figure 2, respectively, and with Figure 5 being on an enlarged scale.

As shown in the drawing, the apparatus of the invention may comprise a tubular casing member 10 which is closed off at its upper end by a tight-fitting plug 11. Rigidly held in a centrally disposed recess formed in the plug 11 by a ferrule 12 is an elongated electric heating element 13 which, in accordance with usual practice, has an outer metallic shell enclosing a resistance element, not shown, to which is connected the conductors of a line cord 14. As shown, the line cord 14 extends outwardly through the ferrule 12 and the outer end of the ferrule 12 is riveted over the outer surface of the plug 11 so that the heating element 13 will be rigidly suspended from the plug 11.

The lower end of the casing member 10 is internally threaded to screw-threadedly receive a shouldered head member 15 which is bullet-shaped as shown and which is provided with a longitudinally extending thru bore 16. The upper end of the head 15 is formed with a series of stepped concentric bores to provide a well 17 having an annular upper shoulder 28.

Slidably received in the bore 16 is a copper stylus pin 18 having a flat-headed upper end 19 and a ball-headed lower end 20. Also rigidly mounted on the pin 16 in a position immediately below the headed end 19 is a disc 21 adapted to overlie the annular shoulder 28. The head 20 is preferably polished and chrome plated to increase the quality of the stylus and to make it long wearing. Also, the pin 18 may be provided with longitudinally extending grooves 22 (see Figure 5) to facilitate the downward capillation of the melted wax or other heat-softenable material which is to be applied by the implement.

It should be particularly observed that the flat lower end of the heating element 13 is spaced upwardly from the flat upper end of the head 19 of the pin 18 when the pin is in lowermost position with the disc 21 resting on the shoulder 28. In this condition of the parts the copper pin 18 cannot receive heat directly from the element 13 so that the fluidity of the wax surrounding the pin 18 is decreased, thereby blocking the outward dripping of wax from the implement. The valving action of the disc 21 also blocks the outward flow of wax but I have found in some models that the disc 21 may be replaced by a simple transverse strut which has no valving action. In either arrangement, the provision of the well 17 is desirable.

It will be understood that the casing member 10 provides a reservoir for a quantity of wax or other heat-softenable material to be dispensed and this reservoir may readily be charged by unscrewing the head 15 as will be understood. Assuming the reservoir to be so charged and current applied to the heating element 13 through the conductors 14 it will be obvious that the heat emitted by the element 13 will melt down but because of the closure of the disc 21 or the solidification of wax in the bore 16, as explained above, no wax will flow to the applicator stylus 20. However, when it is desired to begin the use of the implement the head 20 is placed against the surface to be decorated and a very slight pressure on the casing 10 will cause a sliding movement of the pin 18 whereby the flat head 19 thereof will be brought into direct engagement with the lower end of the heating element 13 and almost instantaneously, because of the high conductivity of the copper, the temperature throughout the length of the pin 18 will rise sufficiently to unplug the capillary passage between the bore 16 and the pin 18 and the stylus point 20 will be covered with liquid wax. By proper expert manipulation of the implement the desired design may be inscribed in wax on the surface to be decorated, as will be understood by those familiar with this decorator's art. So long as the implement is in fairly continuous use the temperature of the pin 18 will remain sufficiently high to maintain a film of melted wax over and about the point 20 but upon the implement being laid aside, for example, the outward flow of wax will cease for the reasons explained above.

I prefer the external casing parts of the implement to be made of heat-insulating materials so that their external surfaces will be comfortable to hold. It is particularly desirable that the head 15 be made of plastic, hard rubber, or similar material having a relatively low coefficient of heat transmission so that little heat is transmitted through it to the pin 18. This allows the conduction of heat through the pin to have control over the fluidity of the wax surrounding the pin, thereby enabling the mode of operation above described.

The above specifically described embodiment of the invention should be considered as illustrative only as obviously many changes may be made therein without departing from the spirit or scope of the invention. Reference should therefore be had to the appended claims in determining the scope of the invention.

I claim:

1. In a wax applying stylus of the fountain type, a tubular casing having an upper end wall, an elongated electric resistance heating assembly having a metallic outer casing disposed centrally and longitudinally in said tubular casing and rigidly carried by said end wall, a tapering head member secured to and closing off the lower end of said tubular casing and formed of heat insulating material, said head member having a centrally and longitudinally disposed bore extending therethrough, and a heat conductive pin slidably received in said bore and projecting outwardly of both ends thereof and having a headed inner end positioned adjacent to and adapted to come into contact with the adjacent longitudinal end of said heating assembly, the arrangement being such that upon downward movement of the casing toward a work surface and upon the lower end of said pin engaging such surface said pin will move upwardly in said bore into engagement with said heat assembly and thereby become heated to soften and melt the wax in said bore while upon vertical withdrawal of said casing and pin from said surface the pin will move out of contact with said heating assembly and be cooled to thereby solidify the wax in said bore.

2. Apparatus according to claim 1 further characterized in that said bore is of increased diameter in its upper end portion to provide a wax-receiving well.

3. Apparatus according to claim 2 further including a fluid-impervious disc secured on said pin immediately below the headed upper end thereof and adapted to engage at its outer periphery the shoulder formed by the bore enlargement to thereby provide a valve to seal off communication between the space within said tubular casing and the lower portion of said bore upon downward sliding movement of said pin.

JOHN J. BELAK.

REFERENCES CITED

The following references are of record in the file of this patent:

UNITED STATES PATENTS

| Number | Name | Date |
| --- | --- | --- |
| 1,815,589 | Saachy | July 21, 1931 |
| 2,243,400 | Stack | May 27, 1941 |

FOREIGN PATENTS

| Number | Country | Date |
| --- | --- | --- |
| 63,651 | Switzerland | Nov. 26, 1912 |
| 244,827 | Great Britain | Dec. 23, 1925 |